May 26, 1970     S. A. KESSELMAN     3,513,784
MACHINE FOR CONTINUOUSLY MAKING FILLINGS FOR SANDWICHES
Filed June 7, 1967     4 Sheets-Sheet 1

INVENTOR
SAMUEL A. KESSELMAN
BY Polachek & Saulsbury
ATTORNEYS

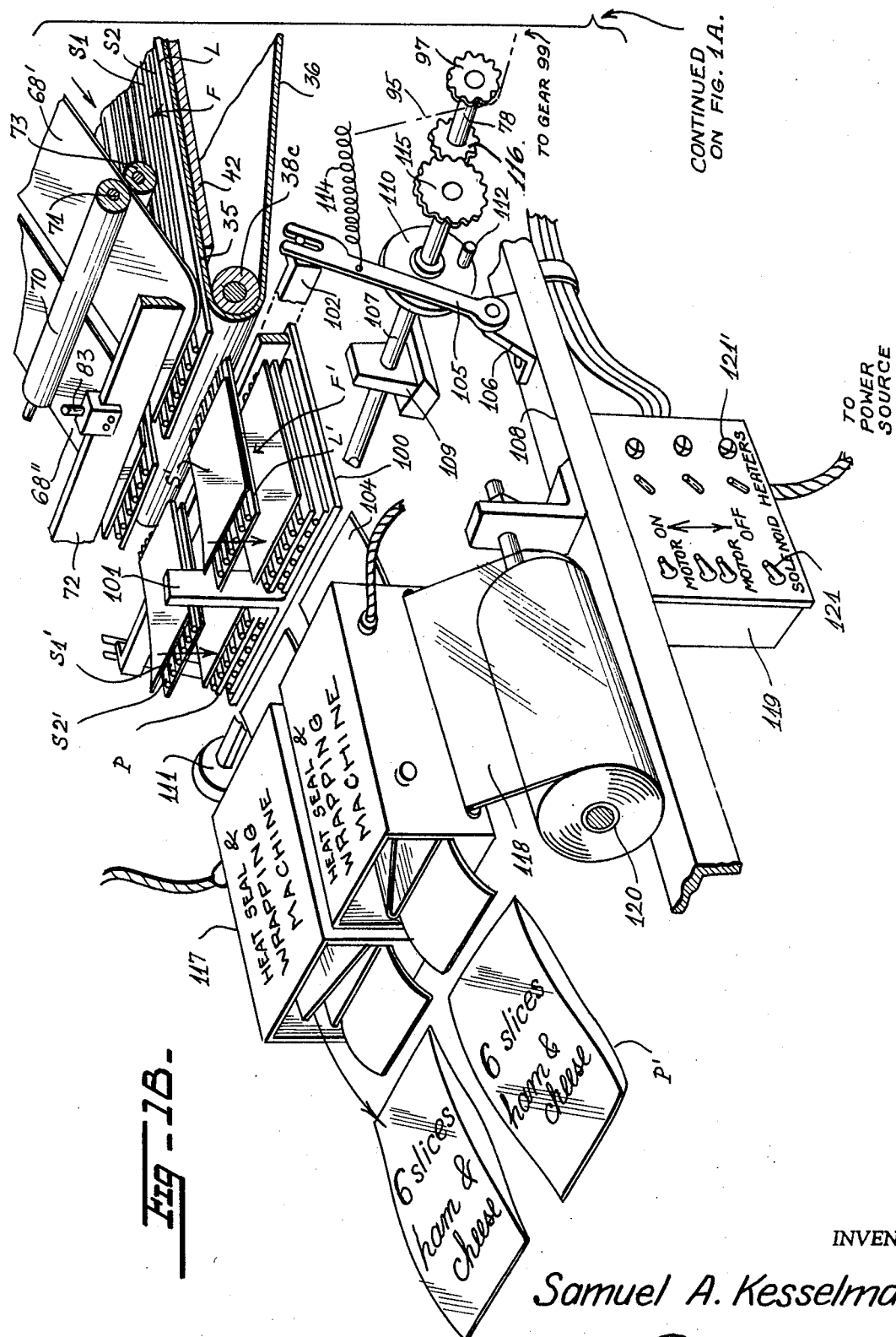

May 26, 1970 S. A. KESSELMAN 3,513,784
MACHINE FOR CONTINUOUSLY MAKING FILLINGS FOR SANDWICHES
Filed June 7, 1967 4 Sheets-Sheet 3
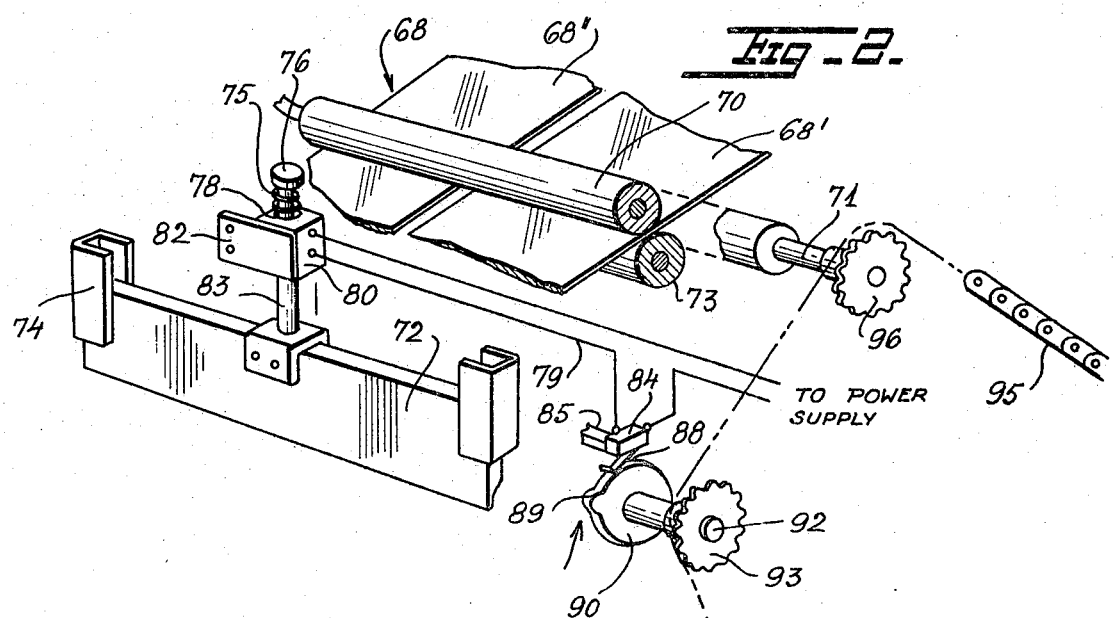
Fig. 2.
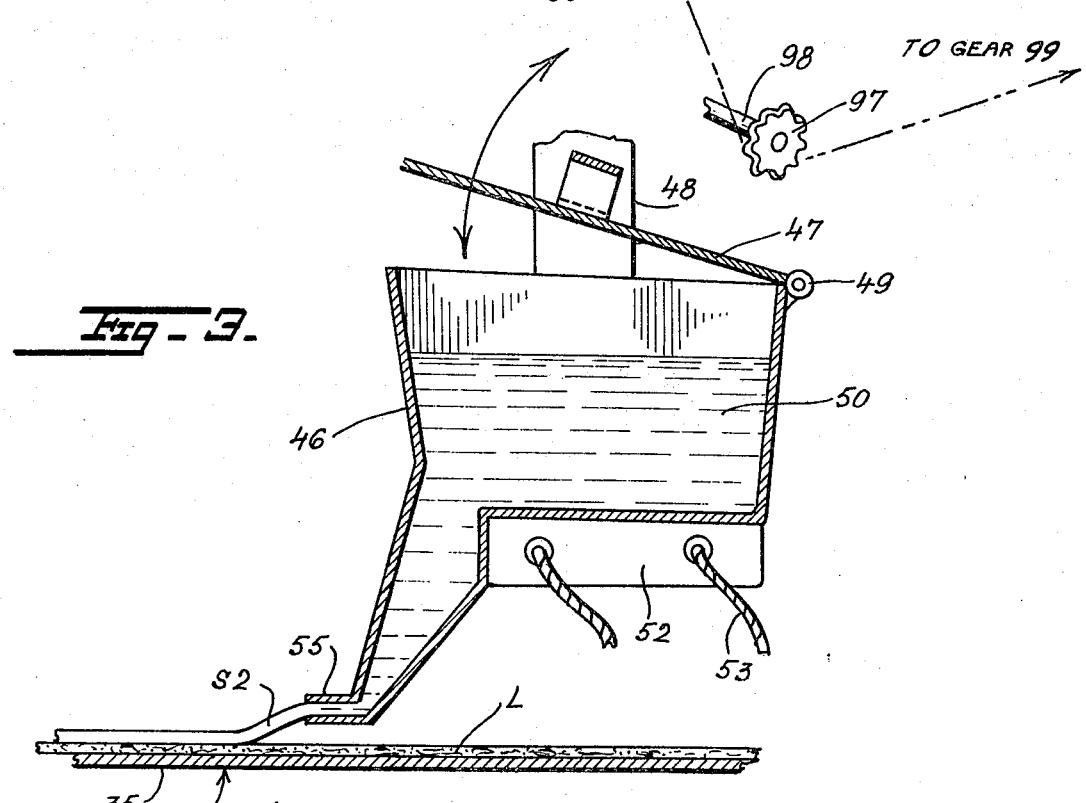
Fig. 3.
Fig. 4.
INVENTOR
Samuel A. Kesselman
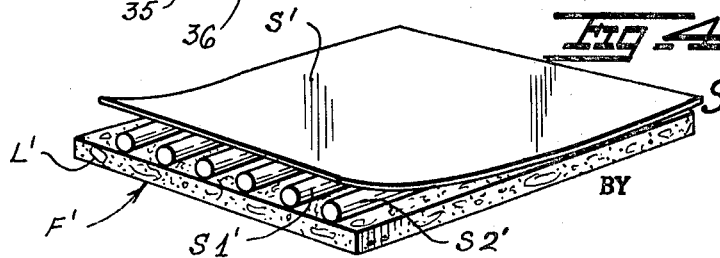
BY
ATTORNEYS INVENTOR
Samuel A. Kesselman
BY Polachek & Saulsbury
ATTORNEYS

3,513,784
MACHINE FOR CONTINUOUSLY MAKING FILLINGS FOR SANDWICHES
Samuel A. Kesselman, 175—25 139th Road, Jamaica, N.Y. 11434
Filed June 7, 1967, Ser. No. 644,323
Int. Cl. A23p 1/00
U.S. Cl. 107—1     7 Claims

ABSTRACT OF THE DISCLOSURE

A machine is described in which a roll of processed meat is rotated continuously while a continuous sheet or layer is sliced from the roll. The layer of meat passes under one or more containers of heated cheese. The cheese is extruded in strips on the moving meat layer. The strips may be of different types of cheese. The layer bearing continuous strips of cheese is cut into individual slices which are separately wrapped.

---

The invention relates to a food product, consisting of a slice of processed meat such as ham, lunch meat or the like bearing individual strips of meltable cheese such as processed American, Swiss, etc. The invention concerns a machine for making such a food product and packaging the same.

Heretofore, ham and cheese sandwiches have usually been made of a filling comprising a rectangular slice of cheese on a rectangular slice of ham. When such a filling is heated on a grill, the cheese generally flows over the edges of the meat, often on to the grill. This is of course objectionable. The present invention is directed at providing a prefabricated sandwich filling in which just enough cheese is deposited on a slice of meat so that when the filling is heated, the cheese will melt and form a uniform coating on the meat.

Another object of the invention is to provide a meat and cheese sandwich filling arranged to facilitate defrosting of the filling from a frozen state. The importance of this feature will be appreciated when it is realized that a frozen conventional assembly of a slice of meat and a slice of cheese will not defrost at the same rate. While the cheese slice melts, part of the meat adjacent to the cheese will still be cool. This is undesirable but is unavoidable since the slice of cheese shields the meat from applied heat. This condition is avoided in the present invention since the spaced strips of cheese on the slice of meat permit the heat to penetrate the meat readily while the cheese is melting.

A further object of the invention is to provide apparatus adapted for making and packaging individual slices of meat and cheese strips as described above.

Another object is to provide apparatus for making and packaging slices of meat on which are strips of cheese of different types in parallel array or in twisted, overlapped array.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 1A and FIG. 1B taken together constitute a perspective view of a machine embodying the invention, parts being broken away or omitted.

FIG. 2 is a perspective view on an enlarged scale of part of the apparatus of FIG. 1B.

FIG. 3 is an enlarged sectional view taken on line 3—3 of FIG. 1A.

FIG. 4 is a perspective view of a meat and cheese assembly as produced by the machine of FIGS. 1A and 1B.

Figure 1A:
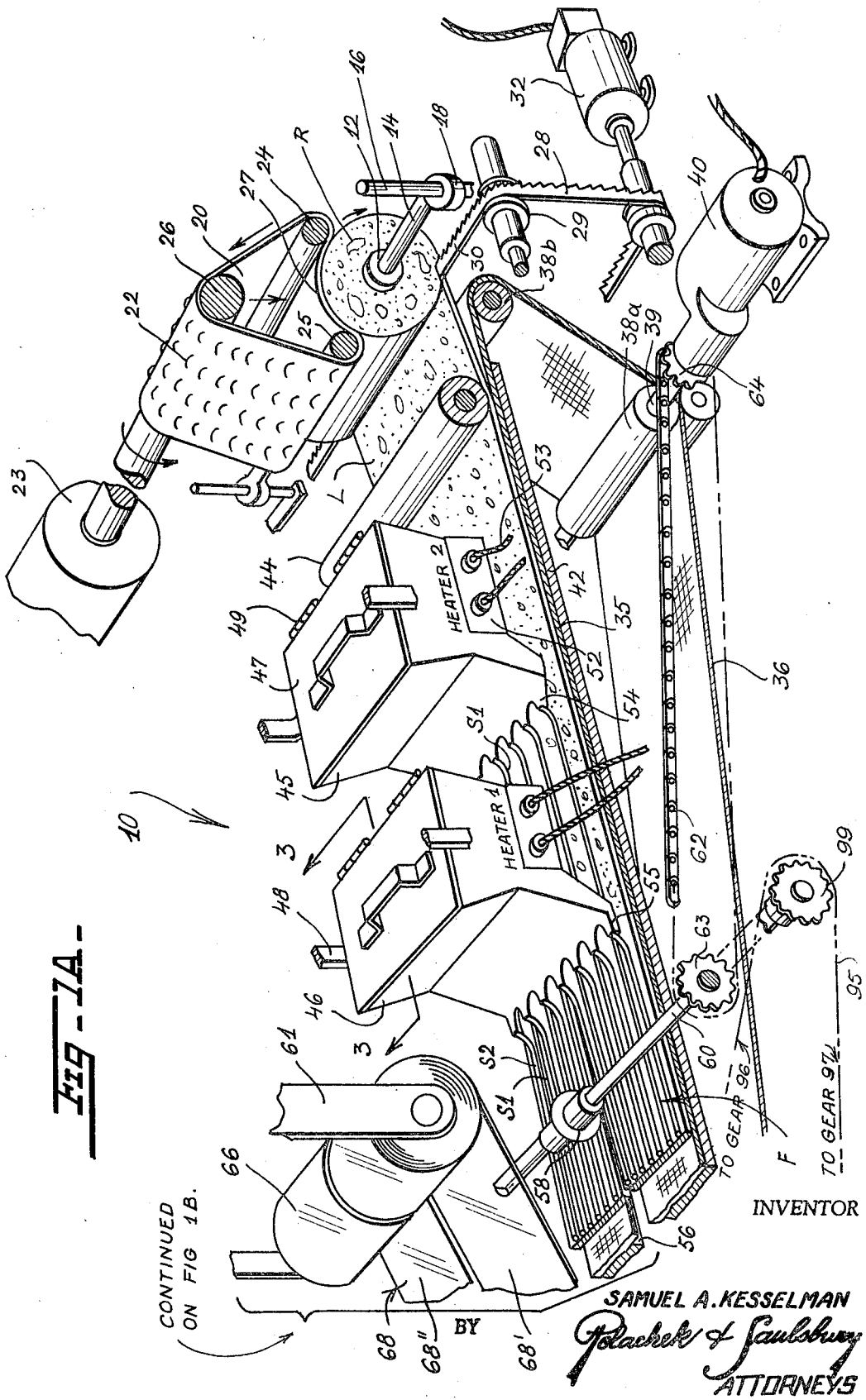

Referring first to FIG. 1A there is shown a cylindrical roll R of ham, luncheon meat or other processed meat. The roll is mounted in machine 10 in axially horizontal position. A sleeve 12 extends axially through the roll. The roll and sleeve are freely rotatable on a horizontal shaft 14 which is mounted for vertical movement on stationary vertical posts 16. Eyes 18 at ends of the shaft are slidably engaged on the post. The meat roll R is turned by an endless belt 20 having projections 22 engaged with the upper side of the roll R. The belt assumes a generally triangular configuration since it is engaged and entrained on three axially parallel shafts 24, 25 and 26. The upper shaft 26 is driven by motor means 23. An endless bandsaw type of blade 28 carried on rollers 29 is driven by a motor 32. The blade has a horizontal course 30 disposed at the bottom of the roll R to cut the roll circumferentially. A thin sheet or layer L is cut as the roll is rotated. While the blade is cutting the roll of meat the shafts 24–26 are lowered to keep the bottom section 27 of the belt bearing down on top of the roll of meat which gradually decreases in diameter. A suitable mechanical arrangement for guiding down the shafts 24–26 and belt 20 is described in my prior U.S. Pat. 3,277,846, so no further explanation of this mechanism need be presented here.

The layer L passes on to the horizontal section 35 of a conveyor belt 36 which is entrained on rollers 38a, 38b, 38c. Roller 38a on shaft 39 is driven by a motor 40. Section 35 of belt 36 passes over a stationary horizontal platform 42. Layer L passes under an idler roller 44 at the right end of the platform. Roller 44 smooths and flattens layer L as it moves along to the left on the conveyor belt.

Just above the belt 36 between ends of platform 42 are two tanks 45, 46 supported by bars 48 from overhead supports (not shown). The tanks are horizontally spaced in the longitudinal direction of movement of layer L. Each tank has a cover 47 secured by hinges 49 to the back of the tank. The tanks contain melted cheese 50 in liquid or semi-liquid form; see FIG. 3. Each tank has an electric heater 52 energized via wires 53 to keep the cheese liquid. The tanks have axially horizontal spaced nozzles 54, 55 directed forwardly in the direction of travel of meat layere L. The nozzles 54 are spaced horizontally from nozzles 55. Cheese rods or strips S1 and S2 are extruded from the nozzles as the layer L passes underneath the nozzles. As the cheese strips or rods leave the nozzles they cool in ambient air and solidify on layer L where they normally adhere to form a continuous assembly F.

Slot 56 can be provided in platform 42 of tank 46. A rotary cutter wheel 58 rotates in this slot to cut the assembly of layer L bearing the solid cheese strips S1, S2 into two equal parts. Wheel 58 is carried by a rotary shaft 60 driven by a gear chain 62 engaged on gears 63, 64 carried by shafts 60 and 39. Just above wheel 58, supports 61 rotatably carry a split roll 66 of sheet material 68. This material can be waxed paper, parchment paper, polyethylene or other suitable sheet material, which will not stick to the meat and cheese.

In FIG. 1B the sheet material 68 arranged as separate sheets 68' and 68" is shown passing between a drive roller 70 on drive shaft 71, and an idler roller 73. The sheet passes in an inclined path down on to the assemblies F of individual meat layers with a plurality of cheese strips S1, S2 on each. The sheet covered assemblies F pass off the left end of platform 42 and left end loop of belt 36 under the horizontal edge of a knife 72. Knife 72 is slidably mounted at its ends in stationary channel guides 74 shown in FIG. 2. The knife is urged upwardly by a coil spring 75 engaged between a cap 76 on the end of axially vertical shaft 78 and a solenoid 80 carried by stationary support 82. The shaft 78 is joined to plunger 83 secured at its lower end to the upper edge of knife 72. The solenoid is periodically energized via wires 79 connected to a power supply, not shown, in series with a microswitch 84. The switch is mounted on a stationary support 85. The switch has an operating arm 88 which is engaged by a finger 89 on cam 90. The cam is carried by a horizontal shaft 92 which also carries a gear 93. On gear 93 is engaged a gear chain 95 which is also engaged with gear 96 on shaft 71, gear 97 on shaft 98 and gear 99 on shaft 60. Chain 95 is thus driven by motor 40 via chain 62 engaged with gears 63 and 64. Each time the finger 89 comes around to switch arm 88 the switch is closed and the solenoid depresses knife 72 to cut a single slice F' of meat L' and strips S1', S2' covered by single sheet S'.

The cut slices F' pile up in two piles P separated by partition 101 on a shelf 100 shown in FIG. 1B. A horizontal bar 102 periodically pushes the piles P off shelf 100 down on to inclined chutes 104. Bar 102 is carried by levers 105 which are pivotally mounted on brackets 106 of machine frame 108. Shaft 107 is journaled in stationary bearing blocks 109. The shaft carries cam wheels 110 and 111 each having a finger 112 which periodically tilts a lever 105 forwardly against tension in an anchored spring 114. On shaft 107 is a gear 115 meshed with a gear 116 on shaft 97. Shaft 97 is turned by chain 95 as explained above. A power control box 119 having switches 121 for controlling the motors and heaters is mounted under frame 108. The heaters have control rheostats 121'.

The piles P slide into conventional wrapping machines 117 disposed side-by-side to receive the respective piles. There the piles of slices are wrapped in transparent film 118 drawn off of a roll 120 on frame 108. The wrapping film is heat sealed and cut by conventional means not shown in the wrapping machines. Package P' containing a predetermined number of slices of meat and cheese with sheets S' of sheet material therebetween are discharged from machines 117 to a packing station for shipment.

FIG. 4 shows a single sandwich filling assembly F in which a plurality of strips S1', S2' of cheese of different types are disposed in axially parallel array longitudinally of one side of a rectangular slice L' of meat. The assembly is covered by a single rectangular sheet S' of separating material. This assembly the consumer can place between two slices of bread after removing sheet S'. If the assembly is frozen, defrosting can be accomplished in a grill. The meat slice will heat up in the time the cheese strips melt to form a uniform layer on the slice of meat. Since the strips are spaced from each other and from material edges of the slice of meat the melted cheese will not flow and drip over the edges of the meat. The heat reaches all parts of the meat between strips S1', S2'.

Figure 5:
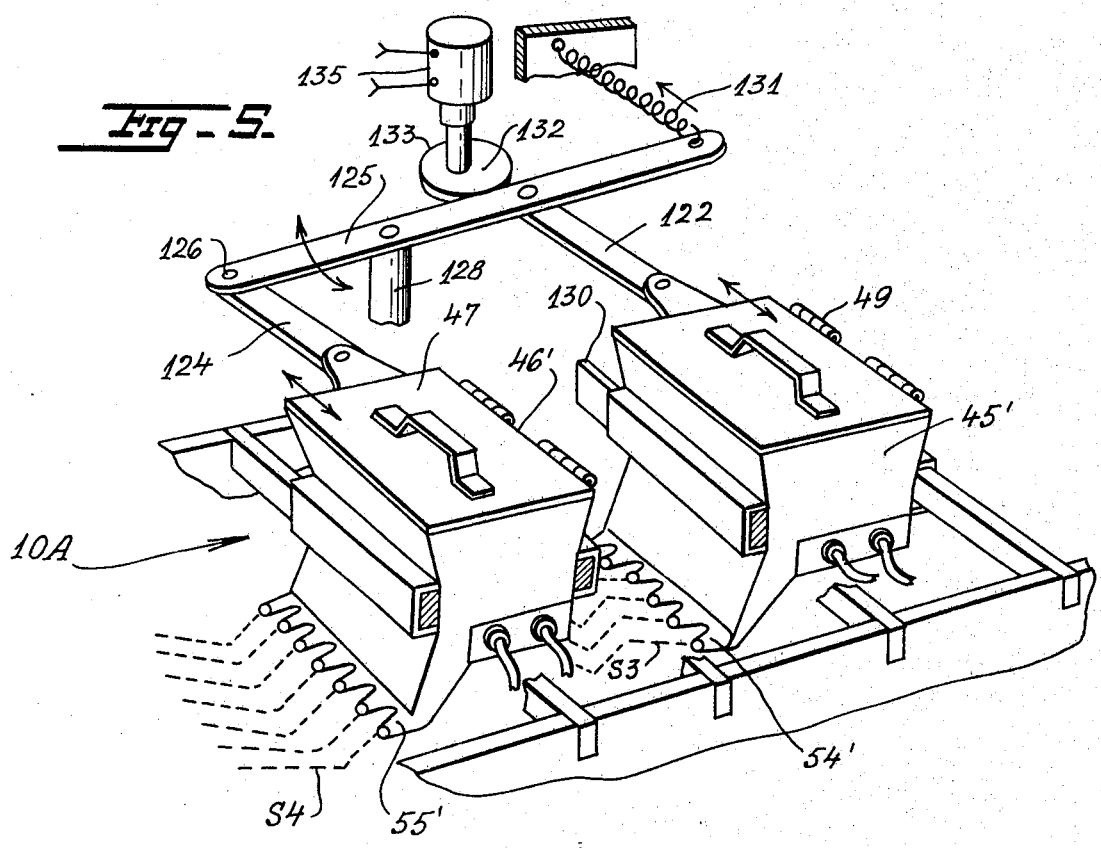
FIG. 5 is a perspective view of part of another machine embodying a modification of the invention.

FIG. 5 shows part of another machine 10A in which tanks 45' and 46' are mounted on horizontal bars 130 for sliding laterally. The tanks are reciprocated slightly laterally so that strips S3 and S4 are deposited from nozzles 54', 55' in sinuous rather than straight form as clearly shown by dotted lines in FIG. 5 and solid lines in FIG. 6. Attached to sides of the tanks are two links 122, 124 secured pivotally to a lever 125 by pins 126. The lever is pivotable horizontally on a shaft 128, located between links 122 and 124. A spring 131 at the extended end of the lever biases the lever against a cam 132 carried by a shaft 133 driven by motor 135. It will be apparent that the links and tanks will move in opposite directions as the cam 132 turns and lever 125 pivots on shaft 128. Other parts of the machine 10A corresponding to machine 10 are identically numbered.

Figure 6:
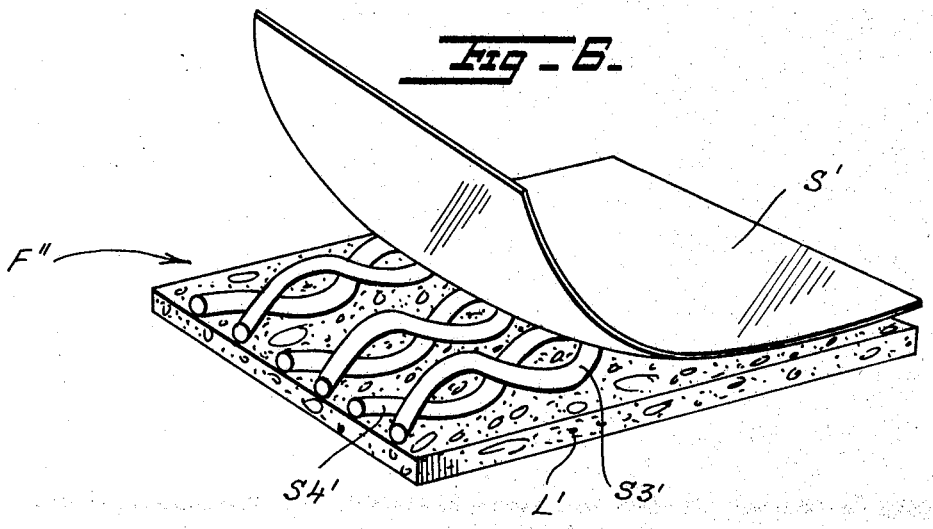
FIG. 6 is a perspective view of another meat and cheese assembly as produced by the machine of FIG. 5.

The assembly F" shown in FIG. 6 has overlapping loops of cheese strips S3' and S4' on meat slice L'. These strips melt to form a uniform layer on the meat slice. The strips which may be of different kinds of cheese melt to form a more homogeneous array than when the strips are axially parallel as in assembly F' of FIG. 4. Furthermore, the overlapping sinuous arrangement insures more effective adherence and resists displacement of the cheese strips on the slice of meat during packaging and subsequent handling.

There is provided apparatus for continuously fabricating meat and cheese fillings for sandwiches. This novel and useful food product fulfills a long felt need of restaurants, food counters and other commercial establishments where the serving of grilled meat and cheese sandwiches has heretofore posed difficult and expensive problems in handling, waste, etc. The packages of meat slices and adhering cheese strips can also be distributed through food stores for home consumption.

While I have illustrated and described the preferred embodiments of my invention, it is to be understood that I do not limit myself to the precise construction herein disclosed and that various changes and modifications may be made. For example, a roll of other sliceable food can be used in place of meat to form slices or layers, and other extrudable foods can be used in place of cheese to form strips which are deposited on the slices.

What is claimed is:

1. A machine for continuously making fillings for sandwiches comprising a rotatable support for a cylinder of a first food, means for rotating the cylinder while on said support, first cutting means for continuously cutting the cylinder circumferentially while rotating the same to form a continuous layer of said first food; a container for an extrudable second food; means supporting said container, a conveyor belt disposed to receive said layer conveying the same forwardly in one direction underneath said container; said container having a plurality of spaced nozzles for discharging horizontally spaced strips of said second food continuously upon said layer as the layer passes under the container, and cyclically operated cutting means disposed just beyond said conveyor to cut the layer into individual slices of said first food with spaced strips of said second food thereon.

2. A machine as defined in claim 1, further comprising another container for an extrudable third food disposed forwardly of the first named container over said conveyor belt, said other container having other spaced nozzles spaced horizontally from the nozzles of the first container to discharge other strips of said third food alternating with the first named strips of said second food on said layer of said first food.

3. A machine as defined in claim 1, further comprising another support for sheet material, means for feeding said sheet material continuously on to the strips of said second food deposited on said layer to cover the same, whereby said cutting means cuts the sheet material into individual sheets on respective slices of said first food and strips of said second food.

4. A machine as defined in claim 3, further comprising a further support disposed just beyond said cutting means for receiving and piling up a plurality of slices of said first food covered with strips of said second food with said sheets disposed therebetween.

5. A machine as defined in claim 2, further comprising another support for sheet material, means for feeding said sheet material continuously on to the strips of second and third foods deposited on said layer to cover the same, whereby said cutting means cuts the sheet material into individual sheets on respective slices of said first food and strips of said second and third foods.

6. A machine as recited in claim 2, further comprising means for horizontally reciprocating said containers in opposite directions simultaneously so that the strips are discharged from the tanks in sinuous overlapping form to resist displacement of the strips on the layer of said first food.

7. A machine as defined in claim 6, further comprising another support for sheet material, means for feeding said sheet material continuously on to the strips of second and third foods deposited on said layer to cover the same, whereby said cutting means cuts the sheet material into individual sheets on respective slices of said first food and strips of said second and third foods.

References Cited
UNITED STATES PATENTS

| | | |
|---|---|---|
| 1,649,563 | 11/1927 | Boettcher 107—45 |
| 2,437,202 | 3/1948 | Marino. |
| 2,660,961 | 12/1953 | Neutelings et al. |
| 2,927,542 | 3/1960 | Moser. |
| 3,185,129 | 5/1965 | Sollich 118—24 XR |
| 3,277,846 | 10/1966 | Kesselman. |
| 3,354,842 | 11/1967 | Manspeaker. |

DANIEL BLUM, Primary Examiner

U.S. Cl. X.R.

53—157; 99—107; 118—24; 146—78